July 23, 1968    D. J. RYAN ET AL    3,393,461
SHOE STIFFENER AND MATERIAL THEREFOR
Filed Dec. 30, 1965

INVENTORS
Daniel J. Ryan
Edward D. Regan, Jr.
by Roberts, Cushman & Grover
Attys

United States Patent Office 3,393,461
Patented July 23, 1968

3,393,461
SHOE STIFFENER AND MATERIAL THEREFOR
Daniel J. Ryan, Bradford, and Edward D. Regan, Jr., Haverhill, Mass., assignors, by mesne assignments, to Emhart Corporation, Bloomfield, Conn., a corporation of Connecticut
Filed Dec. 30, 1965, Ser. No. 517,586
5 Claims. (Cl. 36—77)

ABSTRACT OF THE DISCLOSURE

This invention relates to a shoe stiffener and the stock therefore, the material being of a five ply character with a relatively thick center ply of rigid vinyl plastic united by layers of cement to outermost plies of fabric. The central plastic ply is predominantly polymerized vinyl chloride between 8 and 30 thousandths of an inch in thickness and has a hardness between 50 and 85 (Durometer D) and a stiffness of between 20 and 50 for a thickness of 12–22 thousandths of an inch.

Figure 1:
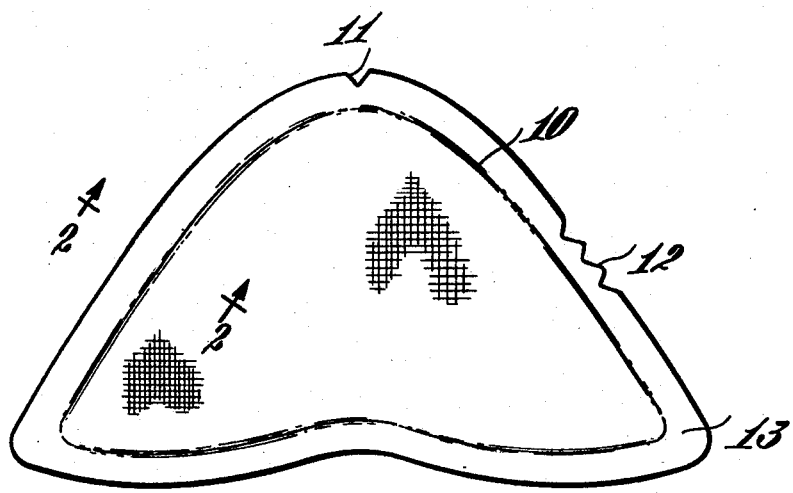

This invention relates to the manufacture of and has for its principal object provision of a new and improved shoe stiffener for incorporation in the upper of a shoe.

Shoe stiffeners are widely used in the manufacture of shoes to resiliently stiffen selected portions thereof, for example at the toe and heel portions of shoe uppers. Various synthetic materials and composites made therewith have been recently suggested. United States Patent 2,734,289 discloses a composite of two layers of fabric laminated under heat and pressure to an intermediate layer of polyethylene. The fabric is necessary to provide means for adhering the stiffener to the shoe upper and the hot laminating technique is required to form the composite. This, however, necessitates an inconvenient and somewhat expensive laminating procedure and the resulting structure sometimes yields poorly bonded assemblies when incorporated into a shoe upper. A similar process is disclosed in United States Patent No. 3,113,906, in which a ply of polyethylene has impregnated plies of fabric hot laminated to its two faces.

Another stiffener material is disclosed in United States Patent 2,611,195 wherein a limp material hardenable by heat polymerization is disclosed. This has the disadvantage of requiring in situ application of heat to the lasted shoe form for curing.

It has now been found that a five-ply laminate structure having a central or intermediate ply of rigid polyvinyl chloride material is especially adapted to form a box toe and/or counter material substantially free of the above limitations. The structure comprises in addition to the central ply, outer plies of textile fabric material bonded to the central ply by means of adhesive. The laminate is conveniently made in flat form by applying adhesive to the central vinyl layer and laminating without the requirements for critical heat and pressure as is the case of stiffeners made of polyethylene or polymerizable compositions. Lamination can be done at any convenient temperature at any convenient time. The stiffeners are made by means of cutting the box toe or counter into the desired shape when flat and skiving the edges to form a tapered margin; followed by heat softening and lasting to conform it to the last and unite it adhesively to the remaining parts of the shoe. The stiffener can be bonded into the shoe structure with a bond strength adequate to prevent separation and often exceeding the strength of the fabric.

The central ply of polyvinyl chloride plastic material should be between about 8 and 30, and preferably between 12 and 22 one-thousandths of an inch in substantially uniform thickness and have a hardness in preferred thicknesses, Durometer D according to ASTM method D1706 at 1 second, of not less than about 50 preferably about 70, and generally is not desired greater than about 85. The plastic should also have a stiffness, according to ASTM D747–61T, of between about 20 and 50 for thicknesses of about 12–22 one-thousandths of an inch when tested on a Tinius-Olsen stiffness tester using a direct scale reading, at a 60° angle, with a ½ pound load for thicknesses up to 17 one-thousandths and one pound load for greater thicknesses, all measurements being made after the sheets have been aged for 7 days.

Rigid polyvinyl material as herein used means solid homopolymers of vinyl chloride or solid copolymers which are predominantly vinyl chloride together with plasticizer not to exceed about 25 parts per 100 parts polymer. Copolymerization generally results in internal plastization which will reduce the permissible external plasticizer which can be used to obtain the minimum hardness and stiffness specified above.

A suitable vinyl composition according to this invention is as follows wherein parts are by weight:

| | |
|---|---|
| Polyvinyl chloride homopolymer (PVC) | 100 |
| Epoxidized soybean oil (plasticizer) | 5 |
| Dioctyl phthlate (plasticizer) | 17 |
| MARK 99 | 3 |
| MARK C | 0.5 |
| Stearic acid (lubricant) | 0.3 |

The PVC polymer was Trulon 520 of the Thompson-Apex Chemical Co., a low molecular weight solid polymer. While the above material is preferred, molecular weight is not critical and other polymers can be used. Copolymers of PVC, for example with vinyl acetate, which are predominantly PVC and which have the required hardness and stiffness can also be employed. Other known vinyl plasticizers can also be used. MARK 99 and MARK C are, respectively, solid barium-cadmium and liquid diphenyl phosphate heat stabilizers of the Argus Chemical Company.

Figure 2:
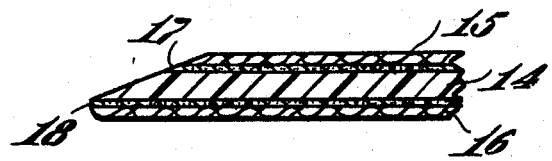

In the accompanying drawings:

FIG. 1 is a plan view of an illustrative five ply laminated shoe stiffener according to this invention; and FIG. 2 is a section on the line 2—2 of FIG. 1.

Referring to the drawings, the illustrated shoe stiffener is of a pheripheral curvature adapted for placement in the toe of a shoe upper to form a box toe. It comprises a main portion 10 of substantially uniform thickness having notches 11 and 12 and a skived perimetric edge 13 exposing inner plies in a feathered edge of tapering thickness and graduated flexibility.

The shoe stiffener comprises the five plies illustrated in FIG. 2, a central ply 14 of rigid vinyl plastic, opposed outer plies 15–16 of fabric, and intermediate layers of adhesive 17–18 adhesively joining fabric plies 15–16 to central ply 14.

Rigid vinyl sheets suitable for layer 14 were made by extruding the above composition and were found to have the following stiffness:

| Thickness, inches: | Stiffness |
|---|---|
| .012 | 21 to 24 |
| .017 | 43 to 48 |
| .022 | 46 to 50 |

Other vinyl sheeting, whether extruded or calendered, having the requisite hardness and thickness can also be used.

When desired, the stored vinyl sheeting is unwound, adhesive applied to its faces, for example 1.0 to 1.5 ounces per square yard to each face, and the outer fabric plies laminated thereto, for example under tension of .05 to 0.5 pound per inch of width, with heat at 320° F.

and pressure of 50 to 100 p.s.i. conveniently applied by rolls. Blanks of a peripherial curvature suitable for a given shoe stiffener can then be cut therefrom, and the marginal or perimetric edge skived where desired. Stiffeners thus prepared can be softened by heat, as by conventional steaming, adhesive applied and the stiffener assembled with the upper on a last.

Any suitable adhesive for the vinyl central layer and for the fabric can be employed. It is preferred to apply the adhesive to the relatively impervious vinyl layer rather than the absorptive fabrics. Vinyl plastisol adhesives are satisfactory and two suitable formulations are as follows:

| Ingredients | Compositions | |
|---|---|---|
| | 1 | 2 |
| PVC Resin | 51 | 51 |
| Tricresyl phosphate | 33 | 30.5 |
| Diisodecyl phthalate | 10.5 | |
| Epoxidized Soybean Oil | 2.5 | 15.5 |
| Monyl-phenol-ethylene oxide adduct | 2.0 | 2.0 |
| Mark BB (barium-cadimum-zinc stabilizer of the Argus Chemical corp.) | 1.0 | 1.0 |
| | 100 | 100 |

Any desired fabric can be used for the outer plies, for example cotton and synthetic woven fabrics, flannel, nonwoven fabrics and other fiber base materials which are adhesive receptive. We have found a 5.75 yards per pound cotton sheeting on one face and a napped fabric such as flannel on the other to be suitable. Stretchable fabrics can also be used on one or both faces where good bending properties are desired.

It should be understood that the foregoing description is for the purpose of illustration and that the invention includes all modifications within the scope of the appended claims.

We claim:
1. Shoe stiffener material comprising a five ply sheet having a central ply of rigid vinyl plastic which is predominantly polymerized vinyl chloride, said central ply being between about 8 and 30 one-thousandths of an inch in substantially uniform thickness, opposed outer plies of fabric, and intermediate layers of adhesive joining said outer fabric plies to the intermediate ply, said vinyl plastic ply having a hardness of at least (Durometer D) and a stiffness between about 20 and 50 when between about 12 and 22 one-thousandths of an inch in thickness.

2. Shoe stiffener material according to claim 1 wherein said vinyl plastic is of the type which is extrudable in sheet form at about 380° F., further characterized in that the adhesive which bonds the outer plies of fabric to the intermediate ply comprises approximately 50% of polyvinyl chloride resin; approximately 30% of tricresyl phosphate; approximately 10.5% of diisodecyl phthalate; and small amounts of soybean oil and a stabilizer.

3. A new and improved stiffener form shoes comprising a composite laminated sheet material according to claim 1, said stiffener having a body of substantially uniform thickness, a peripheral curvature adapted to fit within a shoe, and having a skived margin exposing the vinyl ply in a feathered edge of tapering thickness and graduated flexibility.

4. Shoe stiffener material according to claim 1, wherein one of said fabric layers is a woven cotton fabric of a weight of the order of 5.75 yards per pound, and the other fabric is a napped fabric.

5. Shoe stiffener material according to claim 1, further characterized in that the rigid plastic ply is an extruded sheet material comprising approximately 100 parts of a polyvinyl chloride homopolymer, 20 parts of dioctyl phthalate, 3 parts of a known vinyl heat-stabilizer; and 0.5 part of a stearate, as a lubricator.

References Cited

UNITED STATES PATENTS

| | | | |
|---|---|---|---|
| 2,611,195 | 9/1952 | Brophy et al. | 36—68 |
| 2,734,289 | 2/1956 | Heaton et al. | 36—68 |
| 2,946,141 | 7/1968 | Herliky | 36—68 |
| 3,113,906 | 12/1963 | Hamilton | 36—68 X |

PATRICK D. LAWSON, *Primary Examiner.*

A. R. GUEST, *Assistant Examiner.*